Aug. 31, 1965  P. D. FRIDAY  3,203,115
TOY EDUCATIONAL CLOCK
Filed May 20, 1963
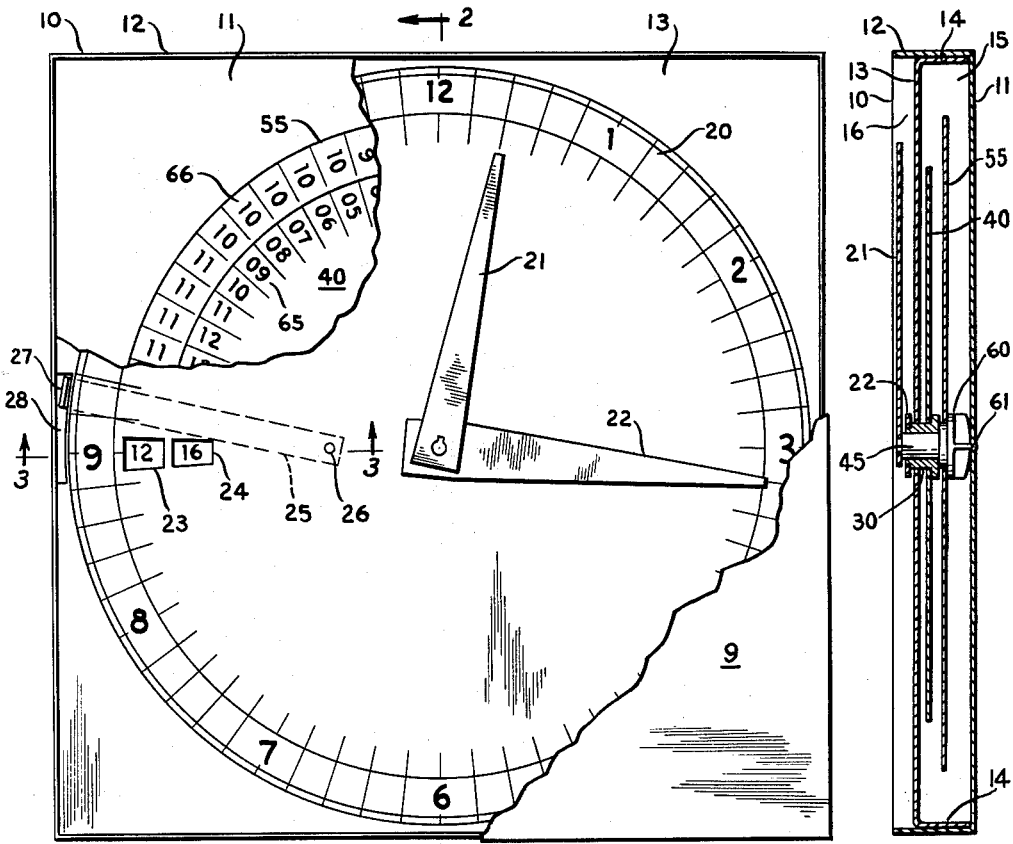
Fig. 1  Fig. 2
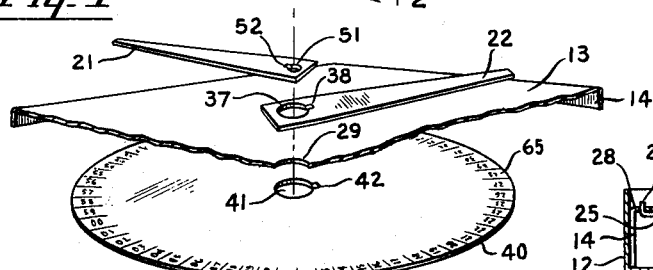
Fig. 4
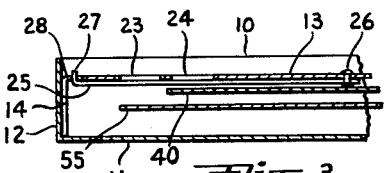
Fig. 3
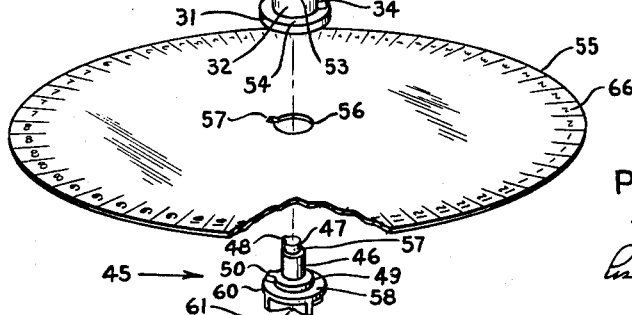
INVENTOR.
PAUL D. FRIDAY
BY
*L. N. Schermerhorn*
Attorney 3,203,115
TOY EDUCATIONAL CLOCK
Paul D. Friday, Portland, Oreg., assignor of one-half to
  Howard C. Gammon, Hillsboro, Oreg., and one-half to
  Donald H. Stanton, Portland, Oreg.
Filed May 20, 1963, Ser. No. 281,639
1 Claim. (Cl. 35—39)

This invention relates to a toy device simulating a conventional clock and embodying special features for teaching the reading of a clock and the telling of time.

Many devices have heretofore been proposed for this purpose but most of them are complicated by extraneous features and are not well suited for teaching the reading of a clock dial in the simple conventional manner of first stating the hour and then the number of minutes past that hour. The complicated nature of the prior devices not only increases their cost but also tends to confuse the child when an excessive amount of data, numbers and legends appear on the clock face. There remains a need for a very simple and inexpensive device for the purpose of teaching time to children.

The general object of the present invention is, therefore, to provide an extremely simple and inexpensive simulated clock device for teaching time to children. Other objects are to provide a device of the type described which can be made of cardboard and plastic without complicated manufacturing operations, a device which presents to view only a conventional clock face plus a pair of windows containing two numbers to indicate the hour and the number of minutes past the hour, and a device which may be incorporated directly into the cardboard box in which the device is sold.

The foregoing and other objects and advantages will become apparent and the invention will be better understood from the following description of the preferred embodiment illustrated on the accompanying drawing. Various changes may be made, however, in the details of construction and arrangement of parts and all such modifications within the scope of the appended claims are included in the invention.

In the drawing:

FIGURE 1 is a top plan view of a toy educational clock embodying the principles of the invention, with parts broken away;

FIGURE 2 is a sectional view taken on the line 2—2 of FIGURE 1;

FIGURE 3 is a fragmentary sectional view taken on the lines 3—3 of FIGURE 1; and FIGURE 4 is an exploded view of the clock mechanism with parts broken away.

The present device is entirely incorporated in a square cardboard box 10 having a bottom wall 11 and side walls 12. This box is adapted to be equipped with a cover shown at 9, for shipping and merchandising. In order to use the clock it is only necesary to remove the cover, the box 10 then serving as a part of the clock and a frame or housing for the clock mechanism which is all contained below the level of the top edge of side walls 12.

The face of the clock comprises a square cardboard sheet 13 having four marginal side flaps 14 which are turned down and glued to the side walls 12 of the box. The width of flaps 14 is less than the height of side walls 12 to provide a space 15 between the face portion 13 and the bottom wall 11 of the box for certain mechanism which will be described. There is also a space at 16 between the face portion 13 and the upper edge of side walls 12 to contain the hands of the clock in a protected position below the upper edge of the side walls.

The outside of face 13 is printed with the usual clock dial 20 which is graduated into hours and minutes. In front of the clock face there is the usual hour hand 21 and minute hand 22 but it will be observed that these hands are not in their usual order of superposition. In the present device, minute hand 22 is next to the face 13 and underlies the hour hand 21. Face 13 is also provided with an hour window 23 and a minute window 24 in the nine o'clock or horizontal position on the left side of the face. These windows may be closed by a shutter strip 25 which is pivotally mounted on the back side of face 13 by a rivet 26. The outer end of shutter strip 25 is bent upward to project through a slot 28 in the face for moving the shutter between open and closed positions.

Face 13 is provided with a central circular opening 29 to receive a sleeve 30. This sleeve has a circular bottom flange 31 surmounted by a smaller cylindrical barrel 32 above which is a still smaller cylindrical barrel 33 at the upper end of the sleeve. These barrel portions are equipped with radial lugs 34 and 35, and extending through the length of the sleeve is a cylindrical bore 36. Lug 34 is of less height in an axial direction than barrel portion 32 so as to leave a cylindrical journal portion on barrel 32 above the upper end of the lug.

Minute hand 22 has a hole 37 to fit barrel portion 33 and a notch 38 to fit lug 35 so that the minute hand will be keyed to the sleeve 30 above face 13. Underneath face 13 there is a minute dial 40 having a circular opening 41 to fit barrel portion 32 and a notch 42 to fit lug 34 so that the minute dial will be keyed to the sleeve. The portion of barrel surface 32 above lug 34 serves as a journal surface for rotation of the sleeve in opening 29 in the face.

Within sleeve 30 is an arbor 45 having a cylindrical journal portion 46 to fit the bore 36. On the upper end of the arbor is a reduced cylindrical portion 47 having a key lug 48 on one side thereof. Below journal portion 46 is a circular portion 49 having a key lug 50 on one side thereof. Circular end portion 47 fits a circular opening 51 in the hour hand 21, and lug 48 fits a notch 52 in the hour hand so that the hour hand will be keyed to the arbor. An hour dial 55 has a circular opening 56 to fit the circular portion 49 on the arbor and a notch 57 to fit lug 50 so that the hour dial will be keyed to the arbor.

Thus, minute hand 22 is connected with minute dial 40, and hour hand 21 is connected with the hour dial 55 which is larger than the minute dial. These connections may be secured by adhesive, minute hand 22 being adhered to shoulder 53 on the sleeve and minute dial 40 being adhered to radial flange surface 54. Similarly, hour hand 21 may be adhered to shoulder 57 on the arbor, and hour dial 55 adhered to radial flange surface 58. The sleeve 30 and arbor 45 are preferably made of a suitable plastic.

The lower end of the arbor has an enlarged head 60 of sufficient thickness to bear against the bottom 11 of the box. In some cases it may be found desirable to form the head 60 with a sharp axial point 61 which will indent or penetrate the bottom 11 and stabilize the whole bearing assembly so that the bearing axis will remain perpendicular to the plane of face 13. The point 61 should have a length less than the thickness of bottom wall 11 so that the point will not protrude through the outside of the box.

Minute dial 40 is provided with a minute scale 65 divided into sixty parts and numbered in a counterclockwise direction as shown. The height of minute window 24 in the face is equal to the distance between these minute graduations, and the minute dial is indexed relative to the minute hand 22 in such position that the number appearing in window 24 will correspond to the number of minutes that the minute hand has progressed from twelve o'clock position. Fractions of minutes are not taken into consideration, it being the intention to always position the minute hand exactly on one of the minute marks on the face dial 20. When this is done, the corresponding number on the minute scale 65 will always be properly centered in window 24. It will be observed that the radius of minute dial 40 is such as to bring the edge of this dial between the two windows 23 and 24.

The hour dial 55 is likewise graduated into sixty divisions and the hour window 23 is of a height to embrace one of these divisions. The hour dial is indexed relative to the hour hand to effect this relationship. The hour dial is also numbered in a counterclockwise direction and it will be apparent that each hour figure must be repeated to appear five times so that the hour hand 21 can be moved from one minute mark to the next without changing the hour designation until the hour hand has arrived at the next hour number on the face dial 20. In order to place each hour number on the hour dial 66 in full view in the hour window 23, the hour hand 21 should always be positioned on one of the minute marks on face dial 20 and not between these marks. The resulting slight error in coordination between the minute and hour hands will be too small to be noticed by the child.

The manner of using the device will be obvious. Teaching the child how to read the time as expressed in the number of the hour followed by the number of minutes past that hour will be facilitated by first leaving the windows 23 and 24 uncovered so that the child will associate the numbers appearing in these windows with the positions of the clock hands. Concurrently with this teaching step, the child may be given problems to read the time from the clock face with windows 23 and 24 covered. When the child has stated the time, the windows may then be uncovered to check his answer.

In this way the teaching will readily progress from the simpler time problems to the more difficult with the windows 23 and 24 covered or uncovered by the teacher to conceal or reveal the time indicated by the hands. With the use of this device the child will readily learn to tell time with a minimum of confusion and extraneous distracting detail which does not contribute directly to learning to express the time simply and directly by the number of the hour and the number of minutes past the hour.

The shutter 25 also makes it possible for the child to devise his own clock problems and for a group of children to make a game of telling time, the correct time for each hand setting always being given when the shutter is opened without the necessity of consulting an adult. Children may thereby learn to tell time with a minimum of adult instruction.

Having now described my invention and in what manner the same may be used, what I claim as new and desire to protect by Letters Patent is:

A toy educational clock comprising a rectangular cardboard box having a bottom wall and side walls, a clock face comprising a flat sheet of cardboard having side flaps of less width than the depth of the box, said flaps being inturned perpendicular to said sheet and secured to inside surfaces of said side walls with the edges of the flaps abutting the bottom of the box whereby the clock face is recessed in the box, a sleeve journaled for rotation in an opening in said face sheet, a radial flange on the inner end of said sleeve, a circular dial secured to said flange, a radial shoulder surface on the outer end of said sleeve, a hand secured to said shoulder surface, an arbor mounted for rotation in said sleeve, a head on the inner end of said arbor bearing against said bottom wall of the box and having an axial point adapted to indent said bottom wall and stabilize said sleeve and arbor perpendicular to said face, a radial shoulder surface on said head, a circular dial larger than said first dial secured to said last shoulder surface behind said first dial, a radial shoulder surface on the outer end of said arbor in front of said first hand, a second hand secured to said last shoulder surface, a pair of windows in said face arranged in side by side relation on a 9 o'clock to 3 o'clock diametral line, hour numbers on one of said dials arranged to appear in the left window, and minute numbers on the other dial arranged to appear in the right window.

References Cited by the Examiner

UNITED STATES PATENTS

| | | | |
|---|---|---|---|
| 1,197,170 | 9/16 | Aylesworth et al. | 273—141 X |
| 1,356,929 | 10/20 | Lemers | 35—39 |
| 1,935,842 | 11/33 | Freel | 35—39 X |
| 2,137,646 | 11/38 | Dorr et al. | 35—39 |
| 2,234,725 | 3/41 | Doerr | 273—142 X |
| 2,539,077 | 1/51 | Hawkins | 35—9 X |
| 2,837,838 | 6/58 | Lewis | 35—39 |
| 2,924,025 | 2/60 | Salisbury et al. | 35—74 X |
| 3,085,353 | 4/63 | Archer | 35—9 |

FOREIGN PATENTS

| | | |
|---|---|---|
| 15,951 | 1895 | Great Britain. |
| 17,281 | 1915 | Great Britain. |
| 567,606 | 2/45 | Great Britain. |

JEROME SCHNALL, *Primary Examiner.*